(12) United States Patent
Martinez-Botas Mateo et al.

(10) Patent No.: US 9,708,913 B2
(45) Date of Patent: Jul. 18, 2017

(54) TURBINE WHEEL, A TURBINE AND USE THEREOF

(75) Inventors: Ricardo Fernando Martinez-Botas Mateo, Twickenham (GB); Alessandro Romagnoli, London (GB); Aman Mohd Ihsan Bin Mamat, London (GB)

(73) Assignee: Imperial Innovations Limited, London (GB)

( * ) Notice: Subject to any disclaimer, the term of this patent is extended or adjusted under 35 U.S.C. 154(b) by 918 days.

(21) Appl. No.: 14/001,230

(22) PCT Filed: Feb. 2, 2012

(86) PCT No.: PCT/GB2012/000110
§ 371 (c)(1),
(2), (4) Date: Feb. 19, 2014

(87) PCT Pub. No.: WO2012/114058
PCT Pub. Date: Aug. 30, 2012

(65) Prior Publication Data
US 2014/0154069 A1      Jun. 5, 2014

(30) Foreign Application Priority Data

Feb. 24, 2011   (GB) .................................. 1103222.4

(51) Int. Cl.
*F01D 5/12* (2006.01)
*F01D 5/14* (2006.01)

(52) U.S. Cl.
CPC .............. *F01D 5/12* (2013.01); *F01D 5/141* (2013.01); *F01D 5/143* (2013.01); *F05D 2210/43* (2013.01); *F05D 2220/40* (2013.01); *F05D 2240/301* (2013.01); *Y02T 10/163* (2013.01)

(58) Field of Classification Search
CPC ............. F01D 5/12; F01D 5/143; F01D 5/141
See application file for complete search history.

(56) References Cited

U.S. PATENT DOCUMENTS 4,027,994 A * 6/1977 MacInnes ................ F02C 6/12
415/1

FOREIGN PATENT DOCUMENTS

| EP | 0982482 A2 | 3/2000 |
|---|---|---|
| EP | 2123861 A2 | 11/2009 |
| WO | 2010020323 A1 | 2/2010 |

OTHER PUBLICATIONS

Effect of Area Ratio of Inlet to Outlet of an Impeller on Performance of a Two Dimensional Centrifugal Compressor, Park et al., 2007. Google Cached.*
PCT International Search Report for PCT/GB2012/000110 mailed Mar. 5, 2012.

* cited by examiner

*Primary Examiner* — Moshe Wilensky
(74) *Attorney, Agent, or Firm* — Kaplan Breyer Schwarz, LLP

(57) ABSTRACT

A turbine wheel for low-pressure ratio applications is disclosed. The ratio of the outlet area of the wheel (A2) to the inlet area of the wheel (A1) is less than approximately 0.4. In an embodiment, the wheel is a radial or mixed-flow wheel.

12 Claims, 8 Drawing Sheets

TURBINE WHEEL, A TURBINE AND USE THEREOF

CROSS REFERENCE TO RELATED APPLICATIONS

This application is a national phase of PCT application No. PCT/GB2012/000110, filed 2 Feb. 2012, which claims priority to GB patent application No. 1103222.4, filed 24 Feb. 2011, all of which are incorporated herein by reference.

FIELD

The present invention relates to a turbine wheel, and a turbine, a turbocompound unit and an exhaust system comprising such a turbine wheel. The present invention also relates to the use of one, more or all of these items.

BACKGROUND

A turbine is a device connected to a shaft and by means of which the energy from a working fluid can be transferred to the shaft. Amongst different types of turbines, a radial turbine is a turbine where the flow enters a radial direction and is turned in the rotor passage to exit in the axial direction. In a mixed-flow turbine, the flow enters with both a radial and an axial component, but usually primarily in a radial direction. Such a feature of radial and mixed-flow turbines makes it suitable for applications where a compact power source is required. The main applications can be divided into three main areas: automotive, aerospace, marine, power generation and other suitable energy recovery applications where a radial turbine is usually part of a turbocharger.

Turbocharging is the most common way of supercharging a reciprocating internal combustion engine since turbochargers are smaller in size, lighter and cheaper than other available devices. The principal aim of supercharging an internal combustion engine is to improve the power density. Supercharging can be defined as the introduction of air (or air/fuel mixture) into an engine cylinder at a density greater than ambient. In doing this, a greater quantity of fuel can be burned in one engine cycle with a consequent rise in the power output. In turbocharger applications such an increase in power output is achieved by using the exhaust gases generated by combustion to power the turbine and in turn the compressor is powered. By doing this the energy of the exhaust gases which would be wasted is then recovered.

A turbocharger is constituted by three main elements: compressor, bearing housing and turbine. A typical turbocharger design is shown in FIG. 1. The turbocharger has a compressor scroll (CS), an impeller (I), a shaft (S), a turbine volute (TH), and a turbine wheel (W). The working scheme of a turbocharger is shown in FIG. 2, in which is shown the engine (E), an intake manifold (IM), an exhaust manifold (EM), a turbine (T), a compressor (C) and a shaft (S). As the exhaust gases quickly move out of the engine cylinders (E) and flow into the exhaust manifold (EM), they are directed into the turbine (T). As the gases flow through the turbine housing (TH), they come in contact with the turbine wheel (W). As they flow through this airflow path and into the exhaust down pipe, they spin the turbine wheel, imparting a portion of their kinetic energy to the turbocharger. By the connecting shaft (S) the power gained in the expansion process is transferred to the compressor (C) which compresses the incoming air through the impeller (I). The compressed air then flows into the compressor scroll (CS) where further compression can take place and finally will be squeezed into the engine cylinders through the intake manifold (IM). After being expanded in the turbine, the exhaust gases leaving the turbine are usually directed into the tail pipe and then expelled to the ambient environment. However the exhaust gases leaving the turbine still have some energy which could still be extracted to further enhance engine performance. Using a further device to accomplish this task is usually referred as "turbocompounding".

Unlike turbochargers (for which the energy extracted from the exhaust gases is directly transferred to the compressor) a turbocompound unit is constituted by an exhaust driven turbine which transfers the energy recovered by the exhaust gases directly to the crankshaft (mechanical turbocompounding) or to an electric generator feeding a battery (electric turbocompounding) via the shaft. Nevertheless it should be understood that the pressure from the exhaust gases available to the turbocompound unit is not large since most of the expansion has already occurred in the turbocharger turbine. The turbocompound unit must be able to operate at very low pressure ratios, for example, with an inlet to outlet pressure ratio of between approximately 1.02 and 1.2. Radial and mixed-flow turbines currently available in the market are designed to operate at higher pressure ratios for which they usually provide a peak normalised total-to-static efficiency which ranges from 0.9 to 1.0. This is shown in FIG. 3 where a typical turbine map for a conventional turbocharger turbine is presented. From FIG. 3 it can be seen that in the pressure ratio (PR) regions greater than 1.2, the turbine performance is as large as ≈0.9. However, as soon as the pressure ratio drops below 1.2, the turbine normalised total-to-static efficiency falls dramatically to values below 0.6. Such a trend is common to all radial and mixed-flow turbines currently existing in the market. As a turbine with normalised total-to-static efficiency below 0.6 is not suitable for use in energy recovery applications, existing turbines are not suitable for use in turbocompounding at low pressure ratios.

Thus it is an object of the present invention to address this deficiency in the prior art technology.

SUMMARY

The present invention aims to address the deficiencies of the prior art by providing a novel combination of features in a radial or mixed-flow turbine wheel.

A method of providing a high performance low pressure turbine has been developed and validated with computational analysis and experimental investigation.

According to a first aspect of this invention, there is provided a turbine wheel for low pressure ratio applications, wherein the ratio of the outlet area of the wheel (A2) to the inlet area of the wheel (A1) is less than approximately 0.4.

The inlet area may be defined as the area described by rotating a first edge of one of the turbine blades about an axis of the turbine wheel, that first edge being an edge arranged to be adjacent an inlet. The outlet area may be defined as the area described by rotating a second edge of one of the turbine blades about the axis, that second edge being an arranged to be adjacent an outlet. The inlet and/or the outlet may be, respectively, an inlet and outlet of a shroud at least partly covering the turbine wheel.

The ratio of A2/A1 may be between approximately 0.3 and approximately 0.4.

According to a second aspect of this invention, there is provided a turbine comprising a turbine wheel as defined above and further comprising a shroud at least partly covering the turbine wheel to define an inlet and an outlet of the turbine.

The ratio of the radius of the root of the blades adjacent the outlet to the radius of the tip of the blades adjacent the outlet may less than approximately 0.7; it may be between approximately 0.2 and approximately 0.7. Instead of the ratio of these two radii, the ratio of the radius (R3) of a hub of the turbine wheel adjacent the outlet to the radius (R4) of the outlet defined by the shroud may be used, the values being approximately as just given on account of that root radius, in most cases, being substantially the same as the hub radius and that tip radius, in most cases, being substantially the same as the outlet radius.

The radius of the tip of the blades adjacent the outlet to the radius of the tip of the blades adjacent the inlet may be less than approximately 1.0; it may be between approximately 0.6 and approximately 0.9. Instead of the ratio between these two radii, that ratio of the radius (R4) of the outlet defined by the shroud to the radius (R1) of the inlet defined by the shroud may be used, the values being approximately just given on account of the corresponding radii being, in most cases, substantially the same.

The exit relative flow angle may be less than approximately −55 degrees; it may be between approximately −41 degrees and approximately −55 degrees.

The turbine wheel may be a radial-flow turbine wheel; the turbine wheel may be a mixed-flow turbine wheel. Accordingly, the turbine may be a radial-flow turbine; the turbine may be a mixed-flow turbine.

According to a third aspect of this invention, there is provided a turbocompound unit comprising a turbine as defined hereinabove.

According to a fourth aspect of this invention, there is provided an exhaust system comprising a turbine as defined hereinabove. The exhaust system may comprise a turbocompound unit, the unit comprising the turbine. The exhaust system may further comprise a turbocharger. The turbocharger may be positioned in the exhaust flow upstream of the turbine. The exhaust system may be an exhaust system for a vehicle. Conceivably, it may be an exhaust system for any application. It may be an exhaust system for an engine.

According to a fifth aspect of this invention, there is provided use of a turbine wheel as defined hereinabove in a flow with a pressure ratio of less than approximately 1.2. The pressure ratio may be between approximate 1.02 and approximately 1.2. The use may be in an exhaust system as defined hereinabove.

Unlike commercially available turbocharger turbines, the newly designed turbine enables to operate at high efficiencies at very low pressure ratios (PR≈1.02-1.2). In such a low pressure ratio region of turbine maps, standard turbocharger turbines experience a large efficiency drop. This is shown in FIG. 3 where it is apparent that at low pressure ratios (corresponding to high velocity ratios), standard turbines fail to provide an adequate response with the normalised total-to-static efficiency dropping below 0.8. By contrast, in such regions of turbine maps, the high performance low pressure turbine proposed herein succeeds in obtaining a higher normalised total-to-static efficiency. In at least certain embodiments, this normalised efficiency is above 0.9.

With the current turbine design, the optimization of the area ratio between the inlet and exit to the rotor, and an adequate selection of the exit relative flow angle made it possible to achieve a peak normalised total-to-static efficiency of about 1.0 to 1.1. at design speed.

Besides being applied to the automotive sector, a low pressure ratio turbine could find its use in other power generation applications where the use of large turbocharged engines and constant operating conditions over long distances, would make a low pressure ratio turbine highly desirable.

At least certain embodiments also provide the following:
Capability to extract a significant amount of power out from low energy content exhaust gases;
Adaptability to different applications such as automotive, aerospace, marine, power generation systems and other suitable energy recovery applications;
Possibility to exploit a retrofit solution to current technology as it is possible to "bolt-on" our concept. Ideally this system can also be contemplated at the early stages of an engine program;
Possibility to integrate the invention into a "more electric" power train, where the excess energy recovered is transformed into electrical energy which is then available for other systems (auxiliaries, supercharging etc);
Possibility of up-scaling to higher power rating as required by the application (the present system has a limited low power recovery rating due to the heavy engine downsizings as well as the limitations of the electrical system: generator/battery).

BRIEF DESCRIPTION OF THE DRAWINGS

Specific embodiments of the invention will be described below by way of example only and with reference to the accompanying drawings, in which.

SPECIFIC DESCRIPTION OF CERTAIN EXAMPLE EMBODIMENTS

The description of the design of a low pressure turbine will now be undertaken. The non-dimensional design procedure is intended to determine the overall turbine configuration.

Embodiments of the invention are described with reference to FIGS. 4 to 14.

The configuration of a turbine is started with two parameters, the blade loading coefficient Φ and the flow coefficient Ψ. The blade loading and the flow coefficient are two non-dimensional parameters; Ψ is defined as the ratio between the actual enthalpy changes (U2·C2·tan α2−U1·C1 tan α1) and the square of the peripheral speed (U1), while Φ is defined as the ratio between the meridional component of the absolute flow velocity (CM1) and the peripheral speed (U1). The blade loading and the flow coefficient are uniquely correlated to the total-to-static efficiency as shown in FIG. 4.

Figure 1:
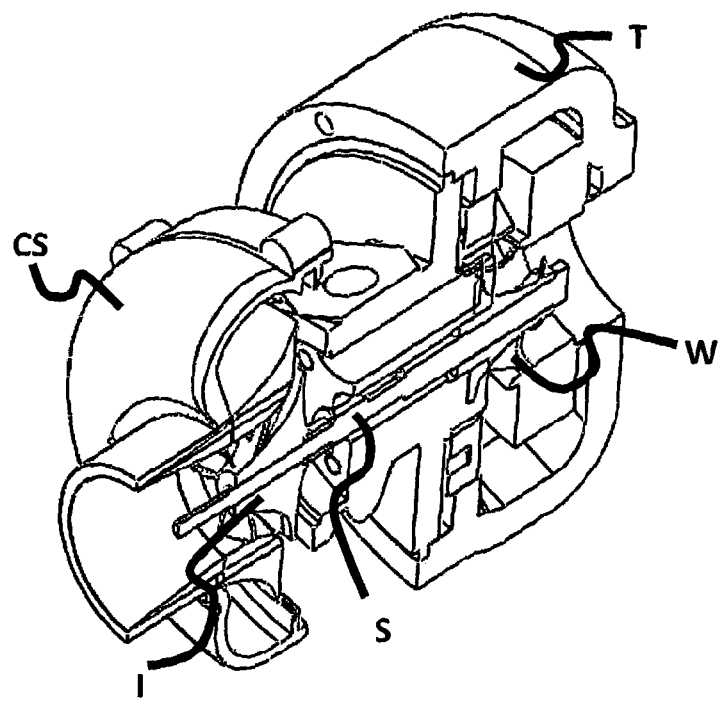
FIG. 1 shows an existing turbocharger design.
Figure 2:
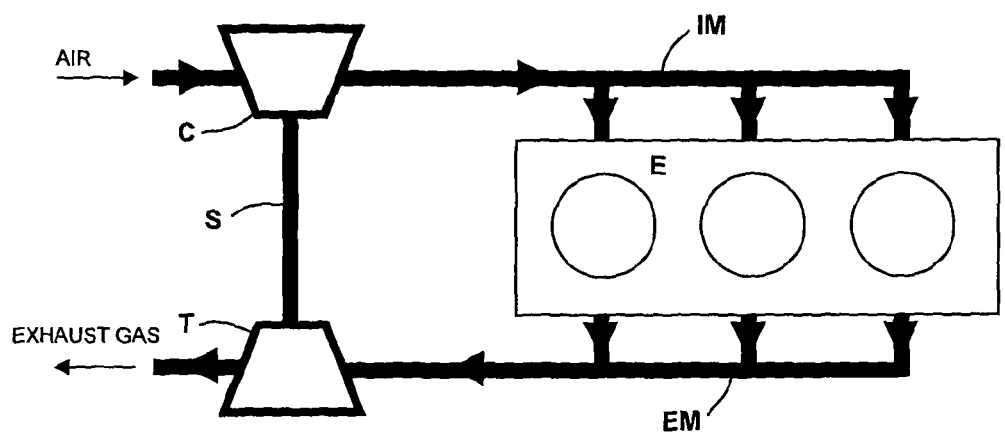
FIG. 2 shows a typical arrangement of a turbocharged engine.
Figure 3:
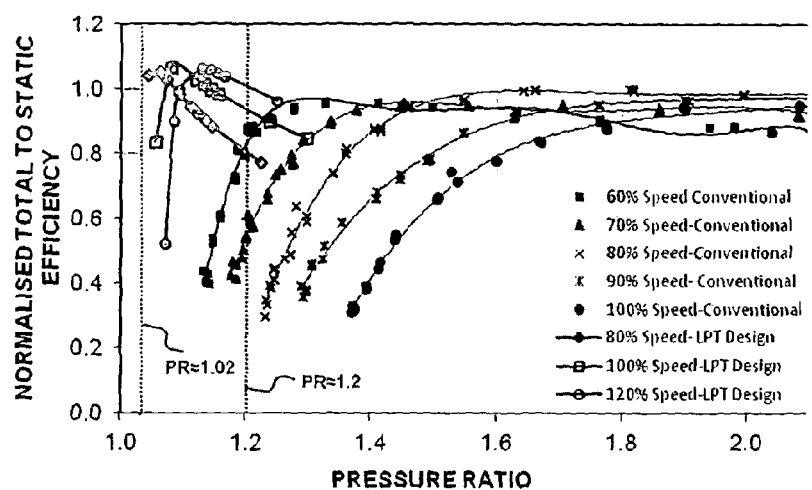
FIG. 3 is a turbine map showing the normalised total-to-static efficiency (vertical axis) vs. Pressure ratio (PR) (horizontal axis). The total-to-static efficiency curves are plotted for constant speed lines as indicated in the legend by the Speed Parameter (SP) given in terms of equivalent percentage speed. This figure gives a comparison between the normalised total-to-static efficiency obtained with prior art applications and that obtained with the embodiments of the present invention ("LPT Design").
Figure 4:
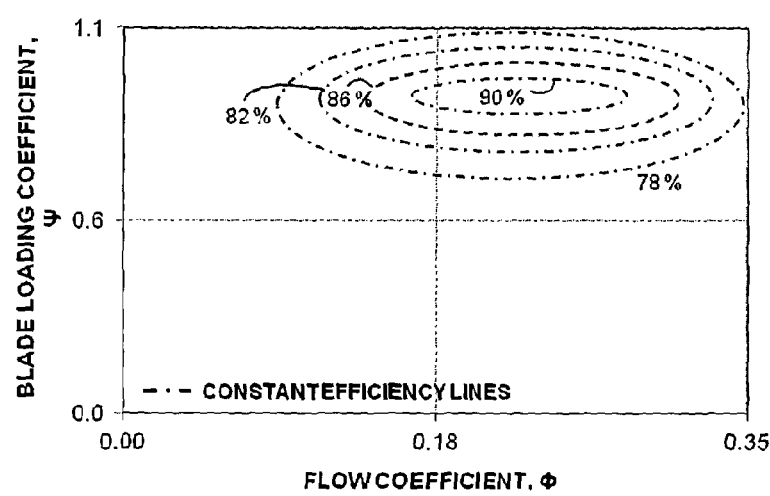
FIG. 4 is a chart correlating the blade loading coefficient ($\Psi$) (vertical axis) and the flow coefficient ($\Phi$) (horizontal axis) with the turbine total-to-static efficiency (dashed lines).
Figure 5:
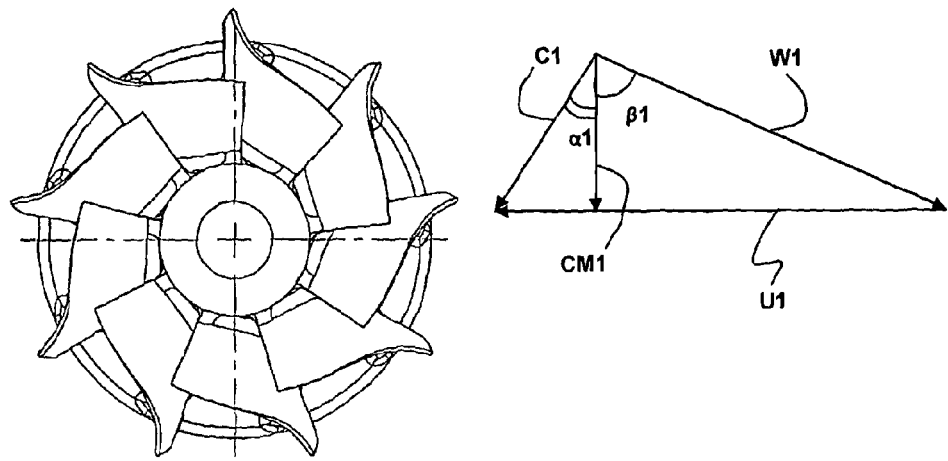
FIG. 5 is an axial view of a turbine wheel that embodies the invention, and shows also a flow velocity triangle at the inlet to the turbine wheel (1). In this Figure are shown the absolute flow velocity (C1), the relative flow velocity (W1), the peripheral speed (U1), the absolute flow angle ($\alpha$1) and the relative flow angle ($\beta$1)

FIG. 4 shows that the optimum total-to-static efficiency region falls in the range of 0.1 to 0.3 for the flow coefficient (Φ) and 0.7 to 1.1 for the blade loading coefficient (Ψ).

This constrains the values of the absolute flow angle (α1) (FIG. 5) to have values below approximately 80°. This amounts to a first requirement.

Figure 6:
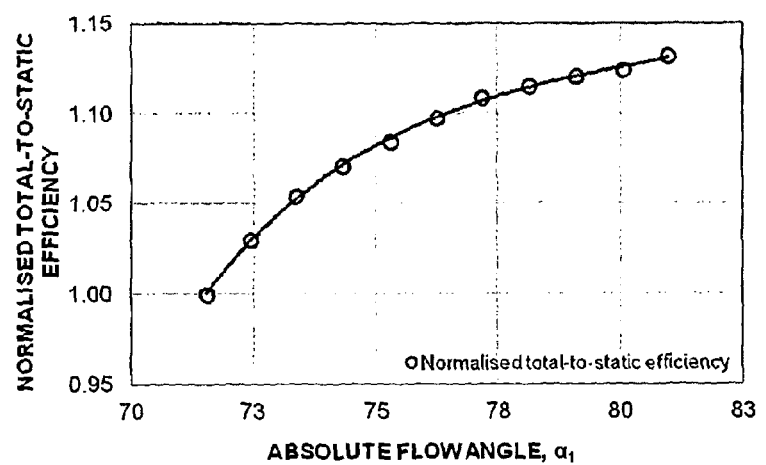
FIG. 6 shows the sensitivity of absolute flow angle ($\alpha$1) (horizontal axis) and the normalised turbine total-to-static efficiency (vertical axis).

This requirement is shown in FIG. 6 where the total-to-static efficiency is plotted against the absolute flow angle α1. The figure shows that the total-to-static efficiency increases as α1 increases. However values too high for α1 cannot be selected as it would cause the absolute flow velocity (C1) to be tangential and it would cause high incidence loss. This will be referred to as a "second requirement".

The requirements set out above constrain the number of blades to vary between 8 and 13. This ensures manufacturability and avoids blade crowding at the exit to the turbine.

All preceding requirements must be satisfied in a low pressure ratio condition (PR≈1.02-1.2) which constrains the wheel geometry to be different from prior art applications of a micro radial/mixed turbine.

Figure 7:
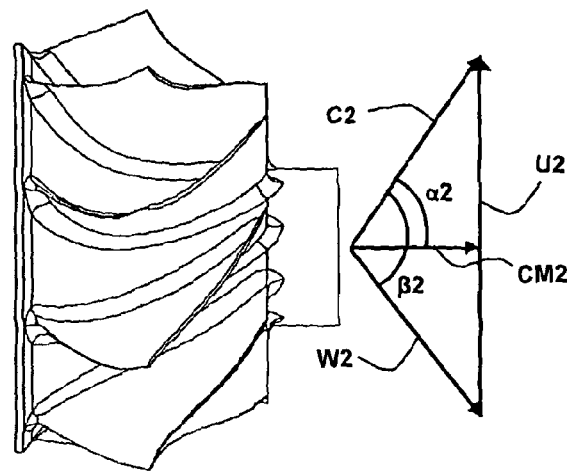
FIG. 7 is a radial view of a turbine wheel that embodies the invention, and shows also a flow velocity triangle at the exit to the turbine wheel (2). In this Figure are shown the absolute flow velocity (C2), the relative flow velocity (W2), the peripheral speed (U2), the absolute flow angle ($\alpha$2) and the relative flow angle ($\beta$2)

Further turbine development is carried out by evaluating the rotor discharge condition (FIG. 7). This is determined by varying the exit relative flow angle (β2) (horizontal axis) with respect to the turbine total-to-static efficiency (vertical axis) as shown in FIG. 8.

Figure 8:
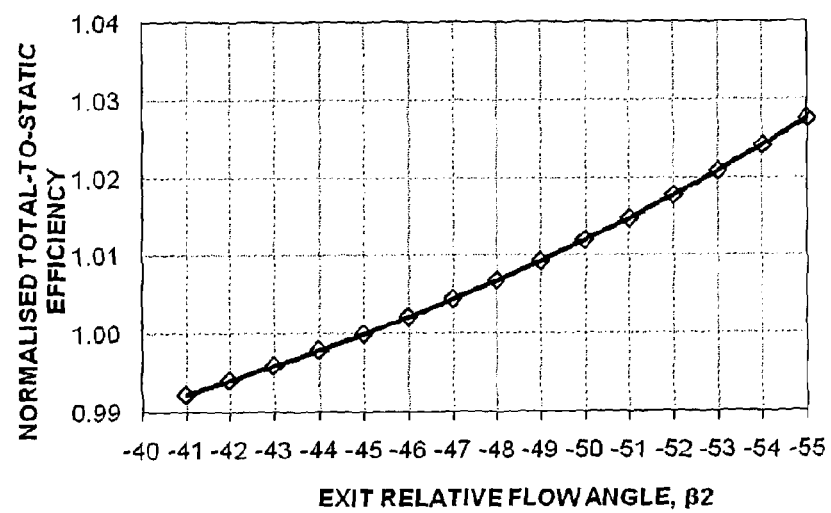
FIG. 8 shows the sensitivity of exit relative flow angle ($\beta$2) (horizontal axis) and the normalised turbine total-to-static efficiency (vertical axis).
Figure 9:
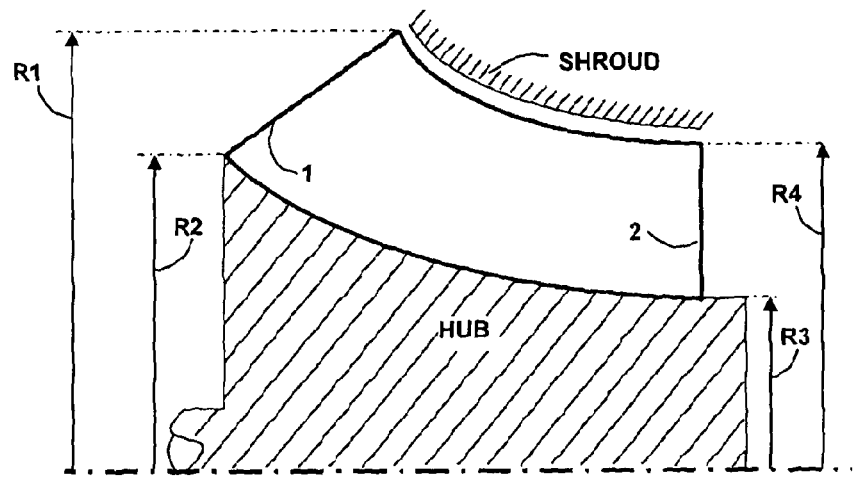
FIG. 9 shows blade profile obtained as a projection on the longitudinal plane.

From FIG. 8 it can be seen that the total-to-static efficiency increases as the exit relative flow angle β2 increases. Thus the value of β2 should be set as high as possible. However a large β2 would increase the amount of flow separation and secondary flows which contribute to total-to-static efficiency loss, thus further limiting the operating range of the turbine.

An optimum exit relative flow angle (β2) therefore needs to be defined in order to prevent flow separation and recirculation to occur but still maintaining higher total-to-static efficiency.

The selection of β2 has a direct impact on the rotor wheel geometry. The geometric parameters which define that geometry are given in FIG. 9.

In this figure are shown the radiuses at the leading edge (R1 and R2) and the trailing edge (R3 and R4) of the turbine wheel:
R1: rotor shroud diameter (leading edge)
R2: rotor hub diameter (leading edge)
R3: rotor hub diameter (trailing edge)
R4: rotor shroud diameter (trailing edge)

Figure 10:
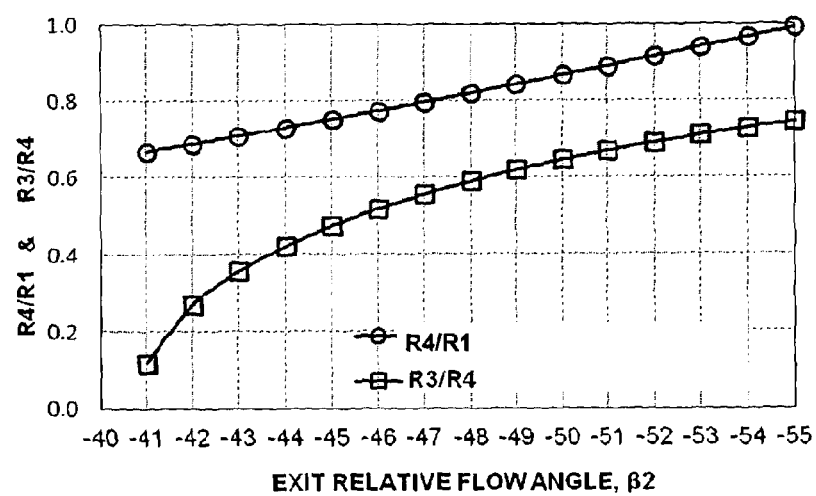
FIG. 10 shows the sensitivity of the exit relative flow angle (β2) (horizontal axis) with the ratio between the exit radius (R4) and the inlet radius ($R_1$) & the ratio between the exit hub radius (R3) and the exit shroud radius (R4) (vertical axis).

The correlation between the exit relative flow angle β2 and the wheel geometry is shown in FIG. 10 where the ratio between the hub exit radius (R3) and the shroud exit radius (R4) is determined for different exit relative flow angles (β2). FIG. 10 shows that the radius ratio R3/R4 increases as the exit relative flow angle (β2) and this would correspond to an increase in total-to-static efficiency (FIG. 7).

The radius ratio R3/R4 must be retained to values ranging within 0.2 and 0.7: values of R3/R4 less than 0.2 would limit the strength of the shaft while values of R3/R4>0.7 would correspond to large hub thus increasing the inertia of the wheel.

The selection of β2 and R3/R4 as set out above also defines the exit to inlet conditions of the turbine blade. The ratio between the shroud exit radius (R4) and the shroud inlet radius (R1) is evaluated and plotted against the exit relative flow angle (β2), FIG. 10.

FIG. 10 shows that the radius ratio R4/R1 varies linearly with β2 and cannot exceed 1.0 since it would cause an expansion too large through the wheel. Hence the radius ratio R4/R1 has to vary between 0.6 and 0.9.

Figure 11:
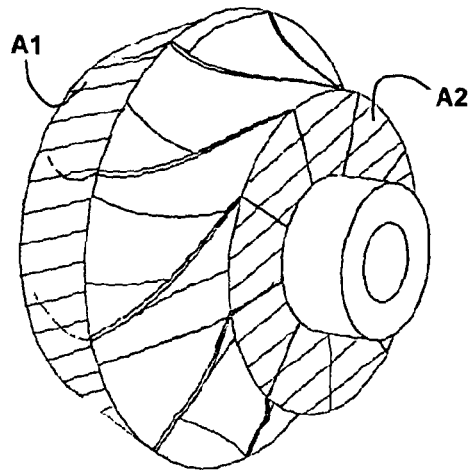
FIG. 11 is an isometric view of a turbine wheel that embodies the invention: the inlet (A1) and the exit (A2) area to the turbine which have been considered in the design are indicated by the dashed areas.

In order to satisfy the low pressure ratio condition whilst still maintaining high total-to-static efficiency, the requirements set out hereinabove can be obtained by retaining a low value of the ratio between the exit area (A2) and the inlet area (A1), FIG. 11.

Figure 12:
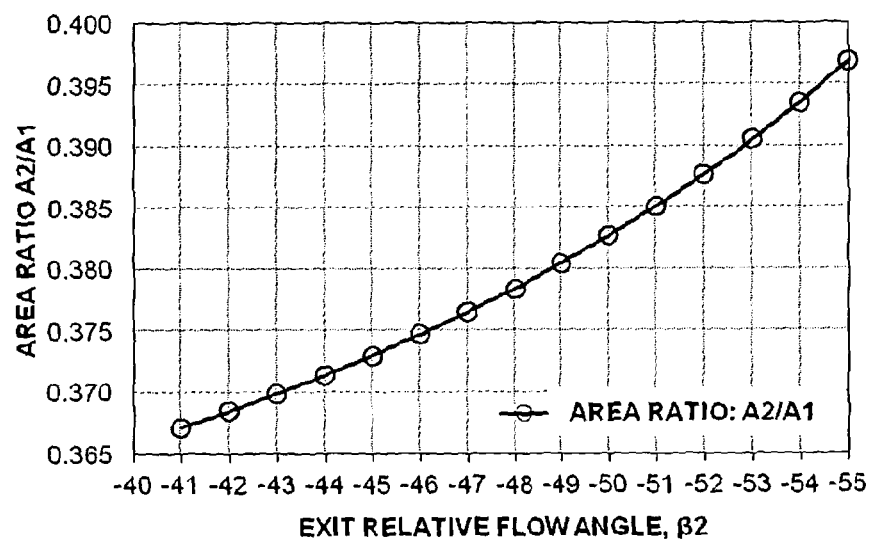
FIG. 12 shows the sensitivity of exit relative flow angle (β2) (horizontal axis) with the ratio between the exit area (A2) and the inlet area (A1) to the turbine (A2/A1) (vertical axis).
Figure 13:
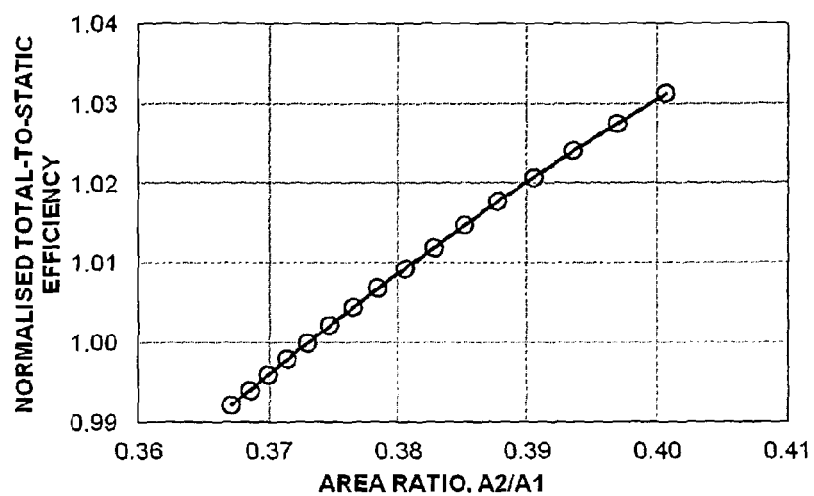
FIG. 13 shows the sensitivity of the ratio between the exit area (A2) and the inlet area (A1) to the turbine (A2/A1) (horizontal axis) with the normalised turbine total-to-static efficiency.

FIG. 12 shows the variation of the area ratio (A2/A1) (vertical axis) with the exit relative flow angle (β2). This figure shows that in order to meet the required flow conditions for β2, a low value of the area ratio must be maintained. This condition is directly related with the turbine total-to-static efficiency, as shown in FIG. 13. The figure shows that an increase in A2/A1 leads to an increase in the total-to-static efficiency.

As a consequence of the direct correlation between the exit relative flow angle β2 and the area ratio A2/A1, the maximum total-to-static efficiency conditions are obtained for A2/A1 lower than 0.4.

The requirements set out hereinabove fix the blade geometry for a radial or mixed-flow turbine wheel operating at low pressure conditions. The shroud inlet radius (R1), the inlet shroud exit radius (R4), the hub exit radius (R3), the exit relative flow angle (β2) and the area ratio condition (A2/A1) uniquely define the blade geometry.

Once the hub and shroud geometrical results had been defined a standard $4^{th}$ degree Bezier polynomial curve is used to define the blade profiles starting from the hub up to the shroud and to generate single camber-line curves.

Figure 14:
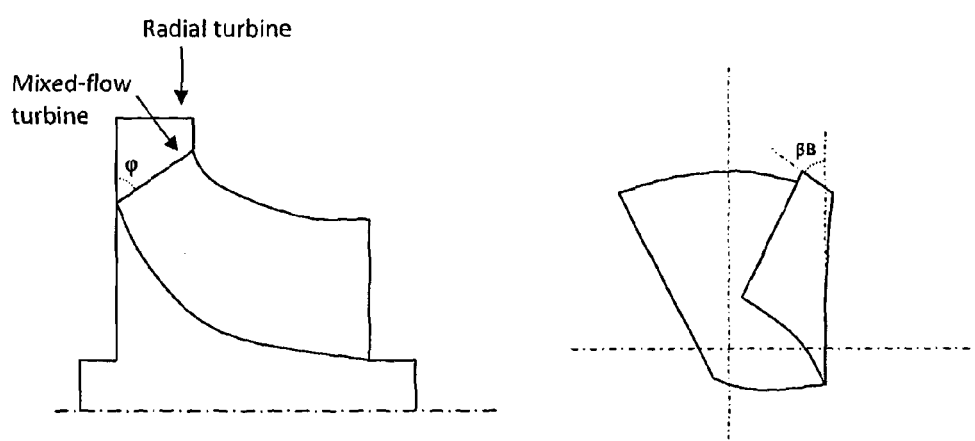
FIG. 14 shows the difference between a radial and mixed-flow turbine.

The blade geometry is finally completed by using a radial fibre blade design method. The distinction between a radial turbine and a mixed-flow turbine is the cone angle ($\phi$) at the inlet to the turbine (FIG. 14). By definition a radial turbine has an inlet blade angle $\beta B=0$ and the blade radial fibre requirement constrains the cone angle to be fixed at $\phi=90°$. In a mixed flow turbine the zero blade angle limitation can be overcome by radially sweeping the inlet blade of a radial turbine but still maintaining the radial fibre condition ($\phi \neq 90°$ and $\beta B \neq 0°$. In addition to this, in a radial turbine the shroud inlet radius (R1) is equal to the hub inlet radius (R2), R1=R2. However the procedure remains unaltered independently of whether a radial or a mixed-flow turbine is designed.

It will be appreciated that the approach disclosed herein of adapting the ratio A2/A1 such that it is below approximately 0.4 is in contrast to established approaches to varying turbine performance. Specifically, it will be understood that established approaches teach the reshaping of the profile of the turbine wheel and of the turbine shroud, and have not hitherto considered the ratio A2/A1 or indeed modifying the turbine such that this ratio is below approximately 0.4 to give a turbine that is especially suited to low pressure ratio applications.

The current disclosure applies both to radial and mixed-flow turbines.

What is claimed is:

1. An exhaust system for a vehicle comprising:
   a turbocharger; and
   a turbocompound unit comprising a turbine downstream of the turbocharger, wherein the turbine is configured to operate with an inlet to outlet pressure ratio between 1.02 and 1.2 and comprises:
   a turbine wheel for low pressure ratio applications, wherein the ratio of the outlet area of the wheel (A2), the outlet area defined as the area described by rotating a first edge of a blade of the turbine wheel about the axis, the first edge being an edge arranged to be adjacent an outlet, to the inlet area of the wheel (A1), the inlet area defined as the area described by rotating a second edge of the blade of the turbine wheel about the axis, the second edge being an edge arranged to be adjacent an inlet, is between 0.3 and 0.4, wherein the ratio of the radius of the root of the blades adjacent the outlet to the radius of the tip of the blades adjacent the outlet is between 0.2 and 0.7.

2. The exhaust system according to claim 1, wherein a ratio of the radius of the tip of the blades adjacent the outlet to the radius of the tip of the blades adjacent the inlet is less than 1.0.

3. The exhaust system according to claim 1, wherein a ratio of the radius of the tip of the blades adjacent the outlet to the radius of the tip of the blades adjacent the inlet is between 0.6 and 0.9.

4. The exhaust system according to claim 1, wherein the exit relative flow angle is less than −55 degrees.

5. The exhaust system according to claim 1, wherein the exit relative flow angle is between −41 degrees and −55 degrees.

6. The exhaust system according to claim 1 and further being a radial-flow turbine wheel.

7. The exhaust system according to claim 1 and further being a mixed-flow turbine wheel.

8. The exhaust system according to claim 1 and further comprising a shroud at least partly covering the turbine wheel to define an inlet and an outlet of the turbine.

9. The exhaust system according to claim 1, wherein a ratio of a radius (R3) of a hub of the turbine wheel adjacent the outlet to a radius (R4) of the outlet defined by the shroud is less than 0.7.

10. The exhaust system according to claim 1, wherein a ratio of a radius (R4) of the outlet defined by the shroud to a radius (R1) of the inlet defined by the shroud is less than 1.0.

11. A turbine according to claim 8, wherein a ratio of a radius (R3) of a hub of the turbine wheel adjacent the outlet to a radius (R4) of the outlet defined by the shroud is between 0.2 and 0.7.

12. A turbine according to claim 8 wherein a ratio of a radius (R4) of the outlet defined by the shroud to a radius (R1) of the inlet defined by the shroud is between 0.6 and 0.9.

* * * * *